(12) United States Patent
Sergyeyenko (10) Patent No.: US 9,750,197 B2
(45) Date of Patent: Sep. 5, 2017

(54) HEDGETRIMMER WITH SAW BLADE

(71) Applicant: BLACK & DECKER INC., Newark, DE (US)

(72) Inventor: Oleksiy Sergyeyenko, Baldwin, MD (US)

(73) Assignee: BLACK & DECKER INC., New Britain, CT (US)

( * ) Notice: Subject to any disclaimer, the term of this patent is extended or adjusted under 35 U.S.C. 154(b) by 0 days.

(21) Appl. No.: 14/848,960

(22) Filed: Sep. 9, 2015

(65) Prior Publication Data

US 2017/0064909 A1    Mar. 9, 2017

(51) Int. Cl.
  *A01G 3/053*    (2006.01)
  *B23D 65/00*    (2006.01)
  *B23D 61/18*    (2006.01)

(52) U.S. Cl.
  CPC ............. *A01G 3/053* (2013.01); *B23D 61/18* (2013.01); *B23D 65/00* (2013.01)

(58) Field of Classification Search
  CPC ........ A01G 3/047; A01G 3/053; B23D 65/00; B23D 61/18
  USPC ....................................... 30/144, 166.3, 216
  See application file for complete search history.

(56) References Cited

U.S. PATENT DOCUMENTS

| 3,217,408 | A |   | 11/1965 | Jepson et al. |
| 3,309,769 | A |   | 3/1967 | Maxson |
| 3,340,612 | A | * | 9/1967 | Knight ............ A01G 3/08 30/166.3 |
| 3,364,574 | A |   | 1/1968 | Stelljes et al. |
| 3,579,827 | A |   | 5/1971 | FGrahn |
| 3,751,805 | A |   | 8/1973 | Grahn |
| 4,280,276 | A |   | 7/1981 | Comer |
| 4,592,142 | A | * | 6/1986 | Schnizler ........... A01G 3/053 30/210 |
| 4,651,420 | A | * | 3/1987 | Lonnecker .......... A01G 3/053 30/210 |
| 5,031,395 | A | * | 7/1991 | Ohkanda ............ A01G 3/053 172/41 |
| 8,613,144 | B2 | * | 12/2013 | Chun ................ A47J 43/288 30/169 |
| 2007/0101581 | A1 |   | 5/2007 | Carls |
| 2008/0250656 | A1 | * | 10/2008 | Lewis .............. B26B 9/00 30/356 |
| 2009/0188361 | A1 |   | 7/2009 | Simpson et al. |
| 2012/0167395 | A1 |   | 7/2012 | Duffy et al. |

(Continued)

FOREIGN PATENT DOCUMENTS

EP    0422773    4/1991
EP    0974434    1/2000

*Primary Examiner* — Hwei C Payer
(74) *Attorney, Agent, or Firm* — John Yun (57) ABSTRACT

A hedgetrimmer having a blade assembly that includes a sawblade for cutting through larger branches and other vegetative foliage. The sawblade portion is fixedly secured to the reciprocating hedgetrimmer blade assembly to move in linear back and forth motion. It extends beyond a support bar for the hedgetrimmer blades so that it's able to cut through the branch. A support bracket is attached to the support bar to brace and support the branch as its being cut by the saw blade. Also included is a pivotable guard bar at the tip of the blade assembly so protect the blades and to protect any object or structure that may be accidently struck by the blade assembly.

14 Claims, 6 Drawing Sheets

(56) References Cited

U.S. PATENT DOCUMENTS

2012/0167741 A1     7/2012   Duffy et al.
2013/0160304 A1*   6/2013   Tate ........................ B25F 5/02
                                                                           30/381
2017/0064909 A1*   3/2017   Sergyeyenko ......... B23D 61/18

* cited by examiner

HEDGETRIMMER WITH SAW BLADE

FIELD OF THE INVENTION

The present invention relates to vegetation cutting devices, specifically hedgetrimmers having a blade assembly with saw-like teeth for cutting through large branches.

BACKGROUND OF THE INVENTION

Vegetation cutting devices such as hedge trimmers are known power operated tools for cutting hedges and other foliage and vegetation. Typically hedge trimmers are powered by a gas engine or electric motor that drives a blade assembly comprising a pair of reciprocating blades. The teeth on the blades are spaced from one another so that while reciprocating, they create gaps for bush and hedge branches to enter and be cut. These blade teeth have cutting edges along their flanks so that they create a shearing cutting action when the blades reciprocate. However, occasionally large branches are encountered that are too big to enter the gap, or even if they can enter, are too thick to be cut by the blades. Therefore, it would be advantageous to have blade assemblies having cutting edges along the tips of the teeth so as to create a saw-like cutting action to be able to cut through thicker branches.

Such blade assemblies in hedgetrimmers are known in the art, and are shown for example in U.S. Pat. No. 3,751,805 ("the '805 patent"). In the '805 patent, the sawblade is attached to the reciprocating hedgetrimmer blade using a nut and bolt, which are spot welded to the blade. The process of welding bolts to the hedgetrimmer blade and using a nut and bolt increases the complexity and manufacturing cost of such as design.

Another example is U.S. Pat. No. 3,217,408 ("the 408 patent") which shows a hedgetrimmer with a saw blade that is again bolted to the reciprocating blade of a hedgetrimmer. Here, however, the saw blade is fixed on a first side of the hedgetrimmer blade with the hedgetrimmer teeth on a second side. Therefore, only one side of the hedgetrimmer has the shearing cutting teeth which limits its versatility.

Yet another example is U.S. Pub. No. 2012/0167741 which shows a pair of hedgetrimmer blades that have integrally formed end sections that have teeth that are sharpened to their tips to provide a saw-like action to cut through thicker branches. However, because the blades are integrally formed, they would require entirely new tooling to manufacture, and therefore increases manufacturing costs.

Therefore, it would be advantageous to have a hedgetrimmer blade assembly that includes a saw blade for cutting through thick branches. Furthermore, it would be advantageous to have a blade assembly that is easy and cost efficient to manufacture.

BRIEF SUMMARY OF THE INVENTION

Therefore, according to an aspect of the invention, the present invention is directed to a hedgetrimmer having a sawblade, where the hedgetrimmer has a housing containing a motor, and a blade assembly extending out from the housing, having a first and second blade for cutting vegetation. The first and second blade include cutting teeth forming a first configuration. A sawblade is secured to a distal end of the blade assembly with the sawblade having cutting teeth forming a second configuration.

The sawblade can include one of a notch or a projection, and the one of the blades of the blade assembly can have the other of a notch or a projection so that the sawblade is secured to the hedgetrimmer blade by securing the notch to the projection. This structure allows for a cost efficient method of manufacturing the combined hedgetrimmer blade and sawblade. Additionally, the sawblade can be integrally manufactured with the hedgetrimmer blade if desired.

The hedgetrimmer can also include a bracket secured to the support bar to support vegetation as it's being cut by the sawblade assembly. This helps stabilize the vegetation for improved cutting. Additionally, a guard bar can be provided that is pivotally secured a distal end of the support bar, with the guard bar being movable between a retracted position and an extended position where it's tip extends beyond the blade assembly. In this way, the guard bar helps to protect any structure from being damaged by the moving sawblade.

A method of manufacturing the hedgetrimmer blade of the present invention is also disclosed, where a standard blade having a series of cutting teeth on a first and second side is further stamped so that selected cutting teeth are reshaped to form the projections used to secure the sawblade. The sawblade, having corresponding apertures are then pressfit onto the projections to secure the sawblade. Other machining or finishing processes can be performed to further secure the sawblade to the hedgetrimmer blade.

BRIEF DESCRIPTION OF THE INVENTION

Further features and advantages of the present invention will be better understood by reference to the following description, which is given by way of example and in association with the accompanying drawings, in which.

DETAILED DESCRIPTION OF THE INVENTION

Figure 1:
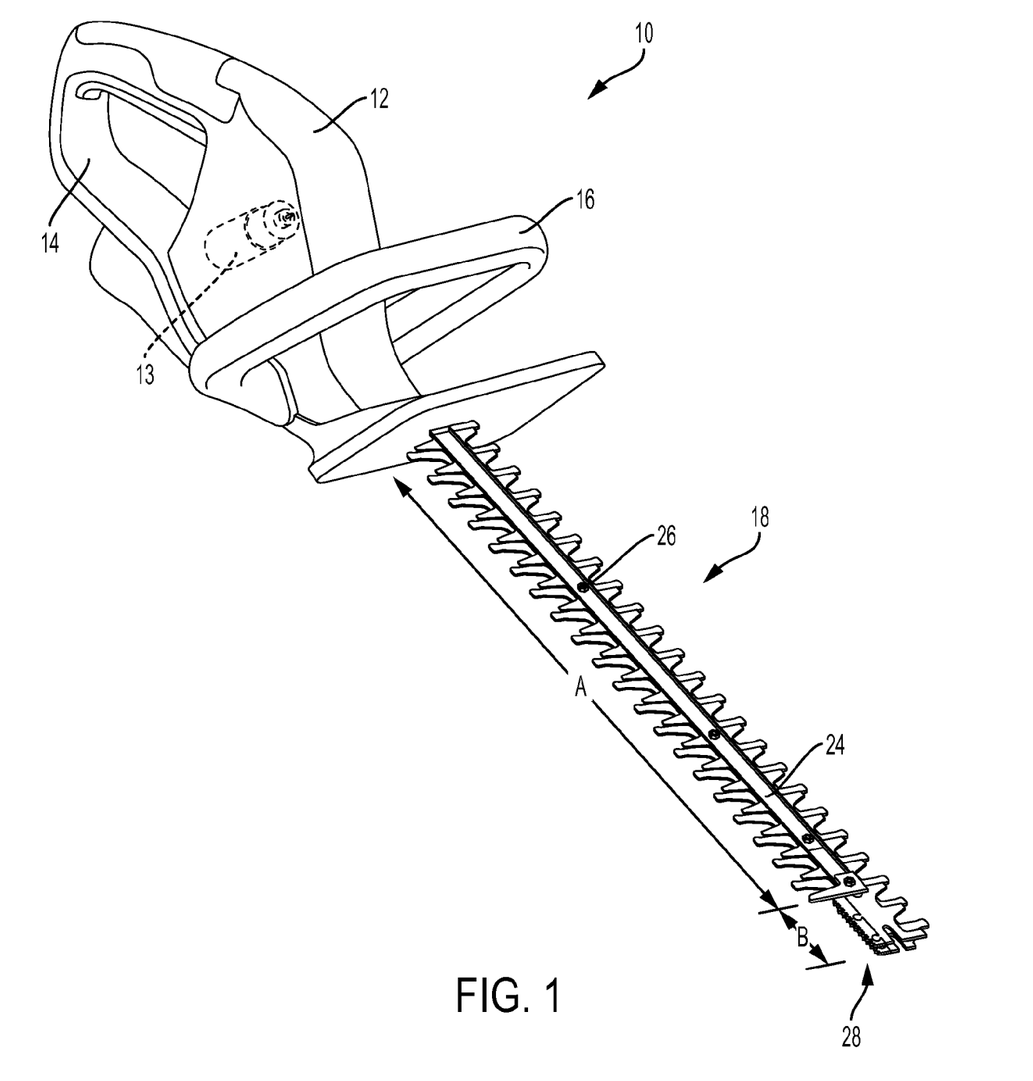
FIG. 1 is a front perspective view of a hedgetrimmer according to an embodiment of the invention.

FIG. 1 shows a hedgetrimmer 10 according to an embodiment of the present invention. The hedgetrimmer 10 has a housing 12 containing an electric motor 13. The housing includes a rear handle 14 and a front auxiliary handle 16. A user is required to place his hands on both handles to securely and safely operate the tool. In a preferred embodiment, the motor 13 is an electric motor powered by a rechargeable battery. Alternatively, the electric motor can be powered by mainline electricity provided through an electrical cord, or could be an engine powered by gasoline or other combustible fuel.

The hedgetrimmer includes a blade assembly 18 having a pair of reciprocating blades, a top blade 20 and a bottom blade 22. See FIG. 2. The blades are secured to a support bar 24 and the support bar 24 is fixedly secured to the housing 12. The top and bottom blades 20, 22 are operatively connected to the electric motor 13 to move them linearly back and forth in a reciprocating manner. The blades 20, 22 include elongate apertures 25 (only a portion of which can be seen in FIG. 2) which allow fasteners 26 to secure the blades to the support bar 24, while allowing them to move linearly relative to the support bar.

Figure 2:
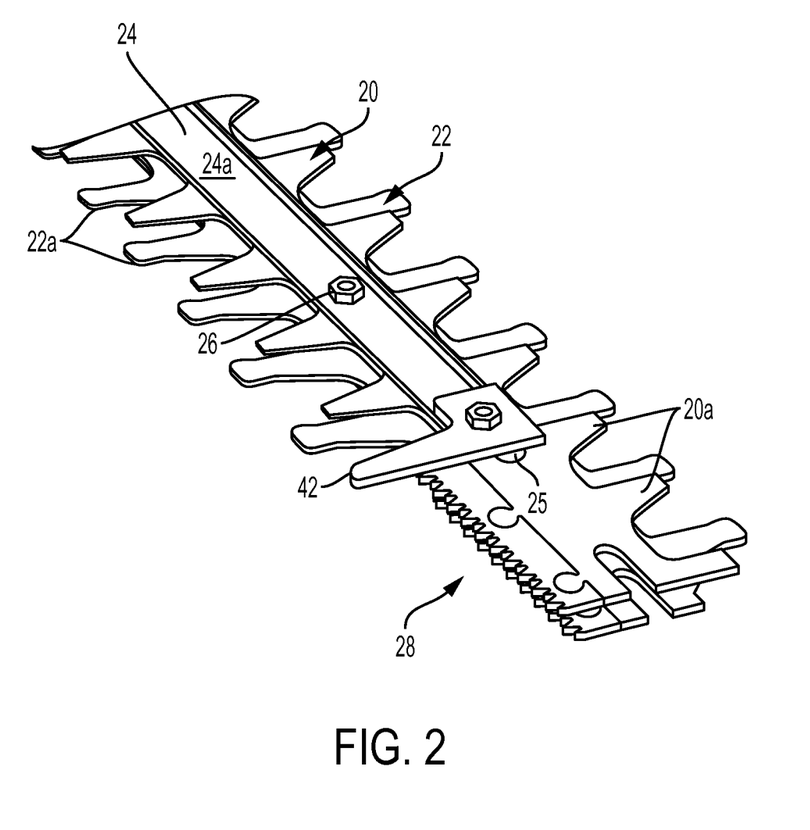
FIG. 2 is a perspective view of the saw blade assembly of FIG. 1.

The top blade 20 is made up of a series of first teeth 20*a*, and similarly the bottom blade 22 is made up of a series of second teeth 22*a*. The teeth 20*a* and 22*a* are spaced from one another to create gaps for the entry of debris and other vegetation to be cut by the blades. The gaps are sized so that most hedge and bush vegetation can enter the gap and be cut by the flanks of the teeth 20*a*, 22*a* through a shearing action.

Occasionally, branches or other debris will enter the gap for which the hedgetrimmer lacks the power to cut the branch, or some branches may be too large to enter the gap. In those situations, the hedgetrimmer blade assembly 18 is equipped with a saw blade assembly 28 that is able to cut through such debris as further described below.

Referring to FIG. 1, the blade assembly 18 includes two sections, first section, labelled A in FIG. 1, extends the length of the support bar 24 and includes the standard hedgetrimmer blade teeth 20*a*, 22*a*. A second section, labelled B, includes the saw blade assembly 28 for cutting through branches and other debris. This saw section B, includes a first side 30 whose cutting teeth are identical to the hedgetrimmer teeth 20*a*, 22*a* in section A. However, on the opposite side 32, the blade assembly 18 is made up of the teeth 20*a*, 22*a* from the top saw blade 34 and a bottom saw blade 36, respectively. See FIG. 3. Importantly, this section of the blade assembly does not include the support bar 24.

Figure 3:
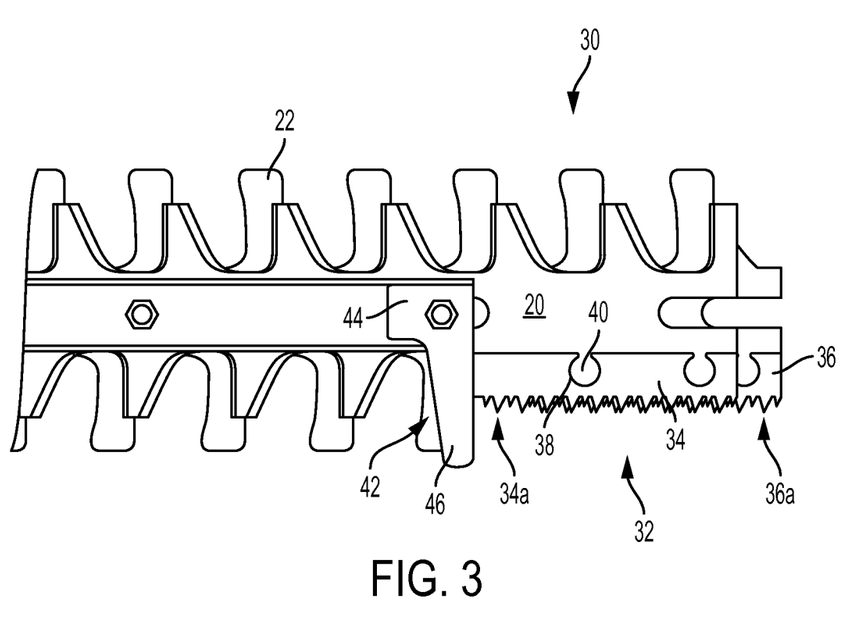
FIG. 3 is a top view of FIG. 2.
Figure 4:
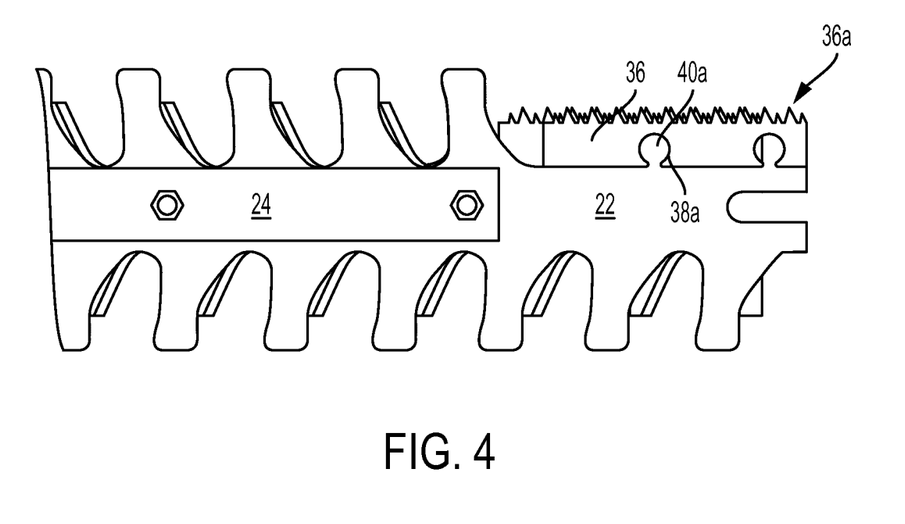
FIG. 4 is a bottom view of FIG. 2.
Figure 6:
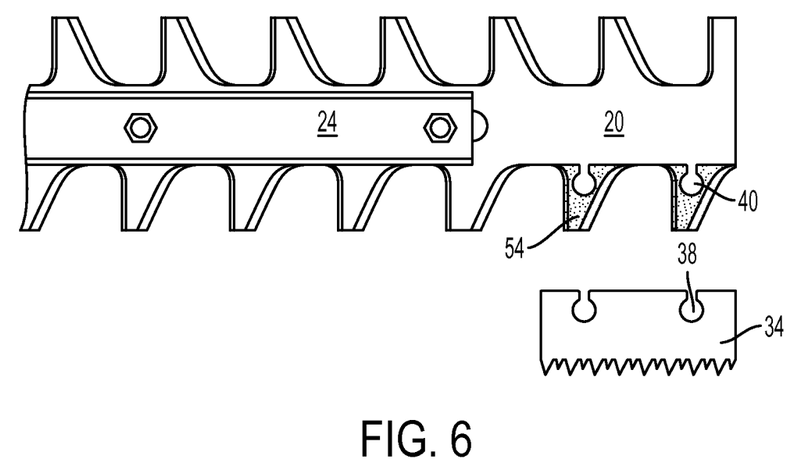
FIG. 6 shows the blade assembly and the sawblade assembly

Referring to FIGS. 3 and 4, the saw blades 34, 36 include cutting teeth 34*a*, 36*a*, respectively, whose cutting teeth are spaced closer together and have cutting surfaces at their tips. The gap between these cutting teeth 34*a*, 36*a* should be small enough to ensure that a user's fingers cannot enter and be accidentally cut. In this way, the saw blades 34, 36 are designed so that only the tips of the teeth 34*a*, 36*a* perform the cutting action to cut through a thick branch via the reciprocating motion of the blades 20, 22. In a preferred embodiment, the top saw blade 34 is attached to the top blade 20, using an aperture 38 on the saw blade 34 that is frictionally secured to a projection 40 on the blade 20. See FIG. 6. Similarly, the bottom saw blade 36 includes an aperture 38*a* to secure it to a projection 40*a* on the bottom blade 22. The projection 40 is shown as circular, but it should be appreciated that it can take any shape. Alternatively, the saw blades 34, 36 can be formed integrally with the respective blades 20, 22.

One of the advantages of using the apertures and projections to secure the sawblade to the blade is that it simplifies manufacturing. For example, a standard hedgetrimmer blade would have its teeth extend all the way to the end of the blade. This standard blade is typically stamped from a piece of metal. To create the projections 40 from the standard hedgetrimmer blade, a second stamping action can be performed that removes the excess material 54 (shown in shadow in FIG. 6) from a hedgetrimmer tooth 20*a* to leave only the projection 40. The sawblade 34 is separately manufactured with the aperture 38 and then press fit onto the projection 40. Preferably, the press fit attachment would be strong enough to secure the sawblade 34 to the hedgetrimmer blade 20, but further processing could be performed, such as welding, if desired.

This two-step process is preferable to simply manufacturing the sawblade integrally with the hedgetrimmer blade because it allows for the use of existing manufacturing tools. Using existing tooling provides the flexibility to continue to manufacture standard hedgetrimmer blades, and only when the sawblade attachment is needed, the manufacturer can then take the additional step of stamping the hedgetrimmer blade to form the protrusion and attach the sawblade. A stamping tool to form the protrusion is much cheaper than the tool necessary to form a hedgetrimmer blade. So this process requires only the new stamping tool rather than an entirely new set of tools for the hedgetrimmer blade with the integral sawblade.

However, it should be understood that the sawblade could be manufactured integrally with the hedgetrimmer blade if desired. Although this may require additional upfront costs, the resultant blade would be stronger and more durable.

Referring now to FIGS. 2 and 3, an L-shaped bracket 42 is shown that is used to support a branch as it's being cut. The bracket 42 has base portion 44 that is secured to the support bar 24. The support bar 24 is generally U-shaped, with a central channel 24*a*. The base portion 44 is secured within this channel 24*a* using a nut and bolt or any other similar means. The bracket also includes a support arm 46 that is perpendicular to the base portion 44. The support arm 46 is used to brace a branch or other debris that's being cut, and keep it stationary as the saw assembly 28 cuts through it. Without the bracket 42, a branch would be more likely to simply move away from the saw assembly 28 as it's brought into engagement with the branch.

Figure 5A:
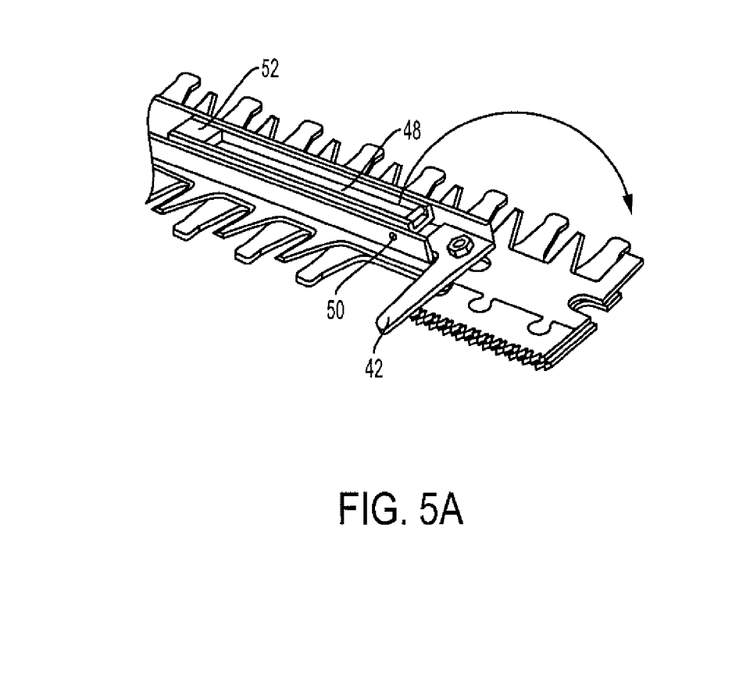
FIG. 5A is an embodiment of FIG. 1 showing a guard bar in the retracted position.
Figure 5B:
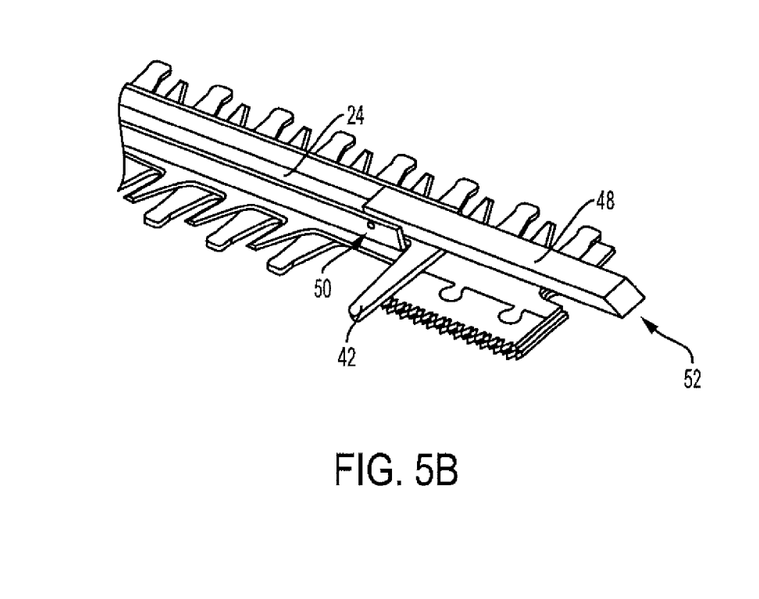
FIG. 5B is similar to FIG. 5A, with the guard bar in the extended position.

Referring now to FIGS. 5A and 5B, a further embodiment of the invention is shown having a guard bar 48. The guard bar is pivotally secured in the central channel 24*a* of the support bar 24. As shown, it is placed on top of the bracket 42, and fixed to the sides of the U-shaped support bar 24 by a pin 50 that acts as an axle allowing the guard bar to rotate. The guard bar has two positions, a first closed position shown in FIG. 5A shows the guard bar 48 folded back onto the support bar 24. FIG. 5B shows a second open position where the guard bar 48 is extended out. When in this position, the tip of the guard bar extends beyond the blade assembly 18. The guard bar 48 prevents the blade assembly from damaging a structure when the hedgetrimmer is in use, such as when there are hedges or bushes along a building or other structure. This helps to protect the structure itself from damage, as well as the hedgetrimmer. Additionally, the tip of the guard bar 48 can include a rubber tip 52 to further protect the structure from damage. The tip 52 does not have to be rubber, but can be any resilient material that can absorb an impact and prevents scuffing or leaving other visible marks. The guard bar 48 can be locked in the closed or open through the frictional engagement with the sides of the U-shaped channel. Additionally, more secure lock can be used to secure the guard bar in either position.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A vegetation cutting device, comprising:
 a housing containing a motor;
 a blade assembly extending out from the housing, the blade assembly having a support bar and a first blade and a second blade for cutting vegetation, the first and second blades including cutting teeth forming a first configuration, the motor operatively connected to the first blade to move it in a reciprocal motion;

a sawblade assembly located on a distal end of the blade assembly, the sawblade assembly having a first sawblade secured to the first blade, the first sawblade having cutting teeth extending away from the support bar and forming a second configuration;

a stationary bracket secured to the support bar to support vegetation as it's being cut by the sawblade assembly; and wherein the cutting teeth of the first sawblade extends in a first direction perpendicular to a longitudinal axis of the blade assembly, and directly opposite to the cutting teeth of the first sawblade are the cutting teeth of the blade assembly.

2. The vegetation cutting device of claim 1, wherein the motor is also operatively connected to the second blade to move it in a reciprocal motion, and wherein the sawblade assembly includes a second sawblade secured to the second blade.

3. The vegetation cutting device of claim 1, wherein the sawblade assembly is positioned beyond the support bar.

4. The vegetation cutting device of claim 3, wherein the bracket is generally L-shaped, and includes a base portion that is secured within a U-shaped channel of the support bar, and a support arm that contacts the vegetation to be cut.

5. The vegetation cutting device of claim 1, wherein the gap between the teeth of the first configuration is larger than the gap between the teeth of the second configuration.

6. A vegetation cutting device, comprising:
a housing containing a motor;
a blade assembly extending out from the housing, the blade assembly having a support bar and a first blade and a second blade for cutting vegetation, the first and second blades including cutting teeth forming a first configuration, the motor operatively connected to the first blade to move it in a reciprocal motion;
a sawblade assembly located on a distal end of the blade assembly, the sawblade assembly having a first sawblade secured to the first blade, the first sawblade having cutting teeth forming a second configuration; and
a guard bar pivotally secured at a distal end of the support bar, the guard bar being movable between a retracted position and an extended position where its tip extends beyond the distal end of the blade assembly.

7. A hedgetrimmer, comprising:
a housing containing a motor;
a blade assembly extending out from the housing, the blade assembly having a support bar and a first blade and a second blade for cutting vegetation, the first and second blades including cutting teeth forming a first configuration, the motor operatively connected to the first blade to move it in a reciprocal motion;
a sawblade assembly integrally formed at a distal end of the blade assembly and lying in the same plan as the blade assembly, the sawblade assembly having a first sawblade located at a distal end of the first blade; and
wherein the first sawblade includes cutting teeth extending in a first direction perpendicular to a longitudinal axis of the blade assembly and directly opposite to the cutting teeth of the first sawblade are the cutting teeth of the blade assembly.

8. The hedgetrimmer of claim 7, wherein the sawblade assembly extends past the support bar so that there are no obstructions above or below the sawblade assembly.

9. The hedgetrimmer of claim 7, wherein the support bar is shorter than the blade assembly.

10. The hedgetrimmer of claim 7, further comprising a stationary bracket secured adjacent the sawblade assembly to support any vegetation being cut by the sawblade assembly, wherein the support bracket extends away from the support bar.

11. The hedgetrimmer of claim 10, wherein the bracket is generally L-shaped.

12. The hedgetrimmer of claim 7, further comprising a guard bar pivotally secured to a distal end of the support bar, the guard bar being movable between a retracted position and an extended position where its tip extends beyond the blade assembly.

13. A method of manufacturing a hedgetrimmer blade assembly comprising the steps of:
providing a hedgetrimmer blade having a series of cutting teeth on a first side and a second side;
stamping at least two of the cutting teeth on a distal end of the hedgetrimmer blade on the first side to form a projection on each of the two cutting teeth; and
fitting a sawblade having two apertures corresponding to the two projections onto the hedgetrimmer blade to form the hedgetrimmer blade assembly.

14. The method of manufacturing a hedgetrimmer blade assembly of claim 13 further comprising the step of polishing the hedgetrimmer blade to smooth out the junction between the sawblade and the hedgetrimmer blade.

* * * * *